(12) United States Patent
Kim et al.

(10) Patent No.: US 8,801,978 B2
(45) Date of Patent: Aug. 12, 2014

(54) BIAXIAL-OPTICAL POLYNORBORNENE-BASED FILM AND METHOD OF MANUFACTURING THE SAME, INTEGRATED OPTICAL COMPENSATION POLARIZER HAVING THE FILM AND METHOD OF MANUFACTURING THE POLARIZER, AND LIQUID CRYSTAL DISPLAY PANEL CONTAINING THE FILM AND/OR POLARIZER

(71) Applicant: LG Chem, Ltd., Seoul (KR)

(72) Inventors: Won Kook Kim, Daejeon (KR); Sung Ho Chun, Daejeon (KR); Kyung Lim Paik, Daejeon (KR); Belyaev Sergey, Daejeon (KR); Malimonenko Nikolai, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/864,992

(22) Filed: Apr. 17, 2013

(65) Prior Publication Data
US 2013/0334718 A1    Dec. 19, 2013

Related U.S. Application Data

(62) Division of application No. 12/458,728, filed on Jul. 21, 2009, now Pat. No. 8,440,117, which is a division of application No. 11/273,328, filed on Nov. 15, 2005, now Pat. No. 7,582,339.

(30) Foreign Application Priority Data

Nov. 15, 2004  (KR) .................. 10-2004-0092967

(51) Int. Cl.
*B29D 7/01*    (2006.01)

(52) U.S. Cl.
USPC .......................................................... 264/1.34

(58) Field of Classification Search
USPC .......................................................... 264/1.34
See application file for complete search history.

(56) References Cited

U.S. PATENT DOCUMENTS

| | | | |
|---|---|---|---|
| 5,011,730 A | 4/1991 | Tenney et al. | |
| 5,344,916 A | 9/1994 | Harris et al. | |
| 5,583,679 A | 12/1996 | Ito et al. | |
| 6,141,075 A | 10/2000 | Ohmuro et al. | |
| 6,639,021 B2 | 10/2003 | Oshima et al. | |
| 6,790,914 B2 | 9/2004 | Kanamori et al. | |
| 7,015,276 B2 | 3/2006 | Morita et al. | |
| 7,110,177 B2 | 9/2006 | Sugino et al. | |
| 7,123,328 B2 | 10/2006 | Sasaki et al. | |
| 2002/0149725 A1 | 10/2002 | Hashimoto | |
| 2004/0106740 A1 | 6/2004 | Kanamori et al. | |
| 2005/0058781 A1 | 3/2005 | Hayashi et al. | |

*Primary Examiner* — Larry Thrower
(74) *Attorney, Agent, or Firm* — McKenna Long & Aldridge, LLP

(57) ABSTRACT

Disclosed is a method of manufacturing a biaxial polynorbornene-film having a compensation film which has good light transmittance and a uniform in-plane retardation value and can function as both a negative C-plate and an A-plate.

4 Claims, 8 Drawing Sheets

BIAXIAL-OPTICAL POLYNORBORNENE-BASED FILM AND METHOD OF MANUFACTURING THE SAME, INTEGRATED OPTICAL COMPENSATION POLARIZER HAVING THE FILM AND METHOD OF MANUFACTURING THE POLARIZER, AND LIQUID CRYSTAL DISPLAY PANEL CONTAINING THE FILM AND/OR POLARIZER

CROSS-REFERENCE TO RELATED PATENT APPLICATION

This application is a Divisional of U.S. patent application Ser. No. 12/458,728 filed Jul. 21, 2009, now allowed, which is a Divisional of U.S. patent application Ser. No. 11/273,328, filed Nov. 15, 2005, now U.S. Pat. No. 7,582,339 which claims the benefit of Korean patent Application No. 10-2004-0092967, filed Nov. 15, 2004, in the Korean Intellectual Property Office, the disclosure of which is incorporated herein in their entirety by reference for all purposes as if fully set forth herein.

BACKGROUND OF THE INVENTION

1. Field of the Invention

The present invention relates to a biaxially-optical polynorbornene-based film and a method of manufacturing the same, an integrated optical compensation polarizer having the film and a method of manufacturing the polarizer, and a liquid crystal display panel containing the film and/or the polarizer. More particularly, the present invention relates to a biaxial-optical polynorbornene-based film having high light transmittance, a uniform in-plane retardation value, and a negative retardation value in a thickness direction, thereby acting both as a negative C-plate and as an A-plate to facilitate a reduction in the thickness of liquid crystal display panels and a simplified manufacturing process, and a method of manufacturing the film, an integrated optical compensation polarizer having the film and a method of manufacturing the polarizer, and a liquid crystal display panel containing the film and/or the polarizer.

2. Description of the Related Art

Liquid crystal display panels are operable for several hours even by battery due to their low power consumption, require a small space due to their small volume, and are easily portable due to their light weight, enabling them to be widely used in televisions, notebook computer monitors, desktop computer monitors, and the like. Meanwhile, with an increased screen area of the liquid crystal display panel, a wide viewing angle, a high contrast, suppressing a change in color according to a viewing angle, and uniform display on a screen become particularly important. For this reason, various modes of liquid crystal display panels using twisted nematic (TN) liquid crystal cells, super twisted nematic (STN) liquid crystal cells, dual domain TN liquid crystal cells, vertical alignment (VA) liquid crystal cells, and the like are being developed. All these liquid crystal cells have inherent optical anisotropy due to their inherent liquid crystal alignment. Thus, to compensate for retardation due to the optical anisotropy of various modes of liquid crystal cells, a compensation film is required.

The optical anisotropy is divided into an in-plane retardation value ($R_{in}$) and a retardation value in a thickness direction ($R_{th}$) given by equations 1 and 2, respectively $$R_{in} = (n_x - n_y) \times d \quad (1)$$

$$R_{th} = (n_z - n_y) \times d \quad (2)$$

Where $n_x$ is a refractive index in a slow axis direction (x-direction) in-plane of film, $n_y$ is a refractive index in a y-direction which is perpendicular to the x-direction in-plane of film, $n_z$ is a refractive index in a film thickness direction (z-direction), and d is the thickness of the film.

When there is a large difference between $R_{in}$ and $R_{th}$, and either one of the values is dose to zero, the film can be used as a compensation film having uniaxial optical anisotropy, i.e., as a uniaxial optical compensation film. When absolute values of the two components are greater than 0, the film can be used as a compensation film having biaxial-optical anisotropy, i.e., as a biaxial-optical compensation film. The uniaxial optical compensation film is divided into an A-plate that satisfies the requirement of $n_x \neq n_y = n_z$ and a C-plate that satisfies the requirement of $n_x = n_y \neq n_z$. The biaxial-optical compensation film satisfies the requirement of $n_x \neq n_y \neq n_z$. When the in-plane retardation value ($R_{in}$) and the retardation value in a thickness direction ($R_{th}$) are appropriately adjusted, one biaxial-optical compensation film can function as both the A-plate and the C-plate, which are uniaxial optical compensation films.

While the in-plane retardation value of the compensation film can be controlled through secondary film processing such as precision stretching, it is difficult to control the retardation value in a thickness direction through secondary film processing. That is, when inherent birefringence in a thickness direction is small, the refractive index in a thickness direction can be controlled through biaxial stretching. In this case, the retardation value to be obtained in a thickness direction is generally smaller than the value to be obtained using a material having inherent birefringence in a thickness direction. Thus, it is preferable to manufacture a compensation film using a transparent material having a molecular arrangement of polymers in the direction of the thickness of film and a molecular arrangement in a planar direction different from each other. In particular, when only compensation of retardation by liquid crystal cells is considered, an ideal compensation film should have an optical axis in a mirror image of an optical axis of a liquid crystal cell. Therefore, for a liquid crystal display device using a VA liquid crystal cell or a TN liquid crystal cell in which the refractive index in a thickness direction is greater than the refractive index in a planar direction, a negative C-plate having negative birefringence in a thickness direction is required.

Polymers useful for the compensation film include discotic liquid crystal (U.S. Pat. No. 5,583,679), polyimide having a planar phenyl group on its backbone (U.S. Pat. No. 5,344,916, a cellulose ester film containing a low molecular weight aromatic compound which may be called as an optical phase retardation agent in a thickness direction (WO 2000/55657), a polycarbonate film (Japanese Patent Laid-Open Publication No. Hei 10-111412), a ring opening polymerized cyclic olefin-based polymer (a compensation film commercially available as trade name "Arton"), etc.

A method of synthesizing a cyclic monomer such as norbornene includes ring opening metathesis polymerization (ROMP), ring opening metathesis polymerization followed by hydrogenation (HROMP), copolymerization with ethylene, and homogeneous polymerization. Referring to reaction scheme 1, it can be seen that although the same monomer is used, polymers having different structures are obtained according to the type of polymerization methods used. These polymers have different physical properties.

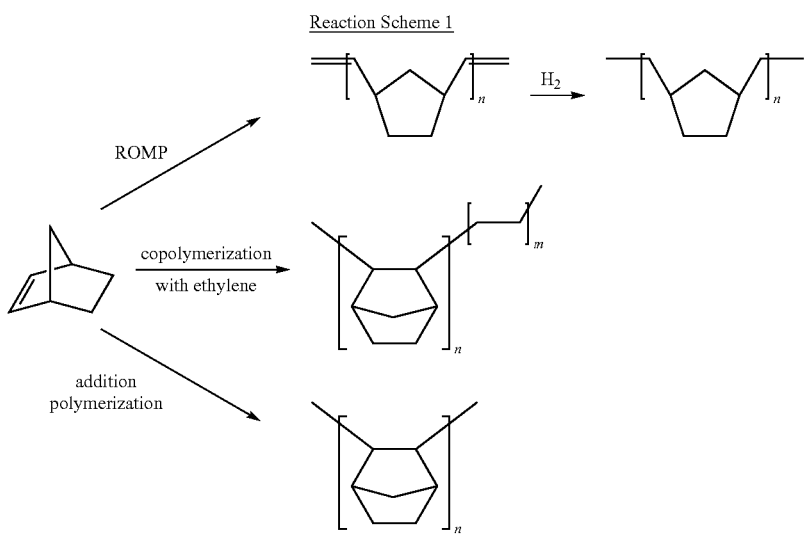

Reaction Scheme 1

Since the polymer synthesized by the ROMP has one unsaturated bond per a repeating unit, it has very poor thermal stability and oxidative stability and is mainly used as a thermosetting resin. The thermosetting resin prepared in this way can form a circuit board through reaction injection molding (RIM) (U.S. Pat. No. 5,011,730). However, the ROMP polymer has a low glass transition temperature in addition to poor thermal and oxidative stability. The HROMP polymer obtained by hydrogenating (addition of hydrogen) the ROMP polymer has increased oxidative stability and generally has about 50° C. higher glass transition temperature than the ROMP polymer. However, the HROMP polymer still has a low glass transition temperature due to an ethylene group located between cyclic monomers (cyclopentane units). In addition, complicated synthesis steps, high production costs, and poor mechanical properties restrict commercial use of the HROMP polymer.

The copolymer of ethylene and norbornene also has a low glass transition temperature of about 140° C. or less (DE Patent No. 109,224).

A polynorbornene-based polymer (hereinafter referred to as "addition-type polynorbornene-based polymer) obtained by addition polymerization of norbornene using a homogeneous catalyst has a bulky ring structure every repeating unit of its backbone. Thus, it has a very high glass transition temperature of about 200° C. or greater, which is at least 50° C. higher than the glass transition temperature of the ROMP polymer or the HROMP polymer. Since it is an amorphous polymer, there is no optical loss due to light scattering unlike a crystalline polymer and no light absorption in the visible range due to a conjugated double bond. Thus, it is suitable for use as a compensation film. In addition, an addition-type polynorbornene-based polymer film has negative birefringence in a thickness direction (Korean Patent Laid-Open Publication No. 2004-0005593). Large retardation in a thickness direction is sufficiently obtained even by solvent casting or coating without biaxial stretching. Since a biaxial-optical film can be obtained by uniaxially stretching the obtained film having a retardation in a thickness direction along a direction parallel to the film plane, the production process of a biaxial-optical compensation film can be simplified. The range of retardation values in a thickness direction and in a planar direction that can be obtained by uniaxial stretching is also large. The addition-type polynorbornene-based polymer is not easily melt-processed due to a high glass transition temperature and should be processed using a solvent casting method. Film that is not completely dried during solvent casting has a significantly reduced glass transition temperature due to the effects of solvent, which enables it to be stretched even at low temperatures.

As described above, the solvent-containing film can be stretched even at a temperature lower than the glass transition temperature of polymer and a plasticizer-containing film can also be stretched even at a temperature lower than the glass transition temperature of polymer. Japanese Patent Laid-Open Publication No. hei 4-204503 discloses a method of stretching a film using 2 to 10 wt % of a solvent based on the weight of solids in a solvent casting process. Japanese Patent Laid-Open Publication No. hei 5-113506 discloses a method of stretching a film, in which a methylene chloride solution is solvent cast, and then a partially dried film is stretched in a film proceeding direction (machine-direction: MD) at 200° C. or less when the amount of the solvent is 3 to 10 wt % based on the weight of solids. Japanese Patent Laid-Open Publication No. 7-92322 discloses a method of stretching polysulfone using 10 wt % or less of a solvent based on the weight of solids. Japanese Patent Laid-Open Publication No. 8-211224 discloses a method of stretching polysulfone using a plasticizer and 2 wt % of a solvent in a solvent casting process.

However, the methods of stretching the film obtained by solvent-casting an addition-type polynorbornene polymer after partially drying as described above have the following problems. That is, use of a plasticizer results in poor durability of the obtained film. When a single solvent is used and the partially dried film is stretched at a temperature higher than the boiling temperature of the solvent, this results in a relatively large change in modulus of the film over time due to volatilization of solvent, which makes it difficult to obtain uniform retardation.

FIG. 1 is a schematic cross-sectional view of an example of a conventional vertical alignment liquid crystal display 10 when a uniaxial optical film is used as a compensation film (U.S. Pat. No. 6,141,075).

Referring to FIG. 1, an A-plate 3 and a polarizer 7 composed of polyvinylalcohol (PVA) are sequentially laminated on a first surface of a liquid crystal cell 1. On one surface or, preferably, both surfaces of the polarizer 7, transparent protective films 5 and 9 composed of triacetate cellulose (TAC) are laminated with an adhesive for protecting the polarizer 7. A negative C-plate 3' and a polarizer 7' composed of PVA are sequentially laminated on a second surface of the liquid crystal cell 1. On one surface or, preferably, both surfaces of the polarizer 7', transparent protective films 5' and 9' composed of TAC are laminated with an adhesive for protecting the polarizer 7'. Meanwhile, in another VA liquid crystal display, both the A-plate 3 and the negative C-plate 3' can be formed on one surface of the liquid crystal cell 1 and the position of the A-plate 3 and the position of the negative C-plate 3' as illustrated in FIG. 1 can be exchanged with each other.

However, the conventional liquid crystal display 10 having such a structure includes many film layers such as the A-plate 3, the negative C-plate 3', polarizers 7 and 7', and transparent protective films 5 and 9 on the liquid crystal cell 1, making it difficult to obtain a thin liquid crystal display and a simplified manufacturing process. Furthermore, the TAC protective film results in problems such as light leakage and reduction in the degree of polarization under high temperature and high humidity due to its relatively high moisture absorption property and has poor durability.

Japanese Patent Laid-Open Publication No. hei 10-111412 discloses a method of manufacturing a compensation film by uniaxially stretching a polycarbonate film obtained using a solution casting method to provide it with birefringence. Using this method, a retardation film with no bubbling and peeling off when being used, which has insignificant non-uniformity of retardation over the whole film and is suitable for color compensation, can be obtained. However, in the case of polycarbonate, it is difficult to realize a sufficient retardation value in a thickness direction by uniaxial stretching.

Meanwhile, stretching of organic polymers is generally carried out at the glass transition temperature of polymers or greater. For example, in Japanese Patent Laid-Open Publication No. hei 10-111412, a polycarbonate film is uniaxially stretched in a machine-direction at a temperature of 145 to 155° C., which is close to the glass transition temperature (about 150° C.) of the polymer. Japanese Patent Laid-Open Publication No. 2001-215332 discloses a method of manufacturing a ring opening polymerized cyclic polynorbornene-based film. In this method, the ring opening polymerized cyclic polynorbornene-based film (e.g. film commercially available as a trade name "Arton") is sufficiently dried and stretched at a temperature of at least 30° C. greater than, in particular at a temperature of 32 to 60° C. greater than, the low glass transition temperature (<200° C.).

However, a film from an addition-type polynorbornene-based polymer (hereinafter, referred to as an "addition-type polynorbornene-based film) more preferable as a compensation film has a high glass transition temperature of 200° C. or greater. Thus, when the stretching temperature is set to be higher than the glass transition temperature of the polymer as in general cases, stretching is carried out at too high a temperature, resulting in yellowing in the addition-type polynorbornene-based film due to pyrolysis. A conjugated double bond created in the molecular structure of film by pyrolysis absorbs light in the range of a short wavelength of visible light, and thus can reduce the light transmittance of film. In addition, the film is brittle, and thus is easily broken. Thus, when the sufficiently dried addition-type polynorbornene-based film is stretched at a temperature higher than the glass transition temperature to manufacture a biaxial-optical film having in-plane retardation, various problems can occur.

Meanwhile, a method of manufacturing a biaxial-optical polynorbornene-based film has been proposed, including obtaining a polynorbornene-based polymer solution using a highly volatile low-boiling solvent such as methylene chloride, casting the polynorbornene-based polymer solution on a substrate, partially drying the solution to obtain a partially dried film, peeling off the partially dried film from the substrate, and stretching the resulting film. The cast method using only the highly volatile low-boiling solvent is advantageous in view of high productivity and low production costs, but has disadvantages that it is difficult to constantly control the amount of a residual solvent in the partially dried film during stretching and uniformly control an in-plane retardation value of the obtained polynorbornene-based film due to relatively fast volatilization of solvent.

SUMMARY OF THE INVENTION

The present invention provides a biaxial-optical compensation film which has high light transmittance and a uniform in-plane retardation value and functions as both a negative C-plate and an A-plate, thereby facilitating the production of a thin liquid crystal display and a simplified production process.

The present invention also provides a method of manufacturing a biaxial-optical polynorbornene-based film using a uniaxial stretching method, which is simpler and more cost-effective than a biaxial stretching method.

The present invention also provides an integrated optical compensation polarizer which has better durability and light transmittance and uniform in-plane retardation value under high humidity conditions and functions as a negative C-plate, an A-plate, and a transparent protective layer for a polarizer, thereby facilitating the production of a thin liquid crystal display.

The present invention also provides a method of efficiently manufacturing the integrated optical compensation polarizer.

The present invention also provides a liquid crystal display panel employing the biaxial-optical polynorbornene-based film or the integrated optical compensation polarizer.

According to an aspect of the present invention, there is provided a biaxial-optical polynorbornene-based film composed of an addition-type polynorbornene-based polymer, in which when $n_x$ is a refractive index in a slow direction (x-direction) in-plane of film, $n_y$ is a refractive index in a y-direction which is perpendicular to the x-direction in-plane of film, $n_z$ is a refractive index in a film thickness direction (z-direction), and $N_z=(n_x-n_z)/(n_x-n_y)$, the film satisfies the two requirements of $n_x>n_y>n_z$ and $1 \leq N_z \leq 10$.

The biaxial-optical polynorbornene-based film may have an $R_{in}$ value defined by Equation 1 ranging from 30 nm to 500 nm and an $R_{th}$ value defined by Equation 2 ranging from −50 nm to −500 nm:

$$R_{in}=(n_x-n_y)\times d \tag{1}$$

$$R_{th}=(n_z-n_y)\times d \tag{2}$$

where $n_x$ is a refractive index in a slow axis direction (x-direction) in-plane of film, $n_y$ is a refractive index in a y-direction which is perpendicular to the x-direction in-plane of film, $n_z$ is a refractive index in a film thickness direction (z-direction), and d is the thickness of a film.

According to another aspect of the present invention, there is provided a method of manufacturing a biaxial-optical polynorbornene-based film, including: preparing a composition by dissolving a polynorbornene-based polymer in a mixed solvent containing a high-boiling solvent and a low-boiling solvent, with a difference in boiling points of the two solvents of 20° C. or greater and an amount of the high-boiling solvent being 0.1 to 15 wt % based on a weight of the polynorbornene-based polymer; casting and partially drying the composition to obtain a polynorbornene-based film containing 1 to 6 wt % of the mixed solvent based on a total weight of the polynorbornene-based film; and uniaxially stretching the partially dried film in a direction parallel with the surface of the film at a stretching temperature less than or equal to the boiling point of the high-boiling solvent +20° C. and drying the stretched film at a temperature greater than or equal to the boiling point of the high-boiling solvent.

According to another aspect of the present invention, there is provided a method of manufacturing a biaxial-optical polynorbornene-based film, including: preparing a polynorbornene-based polymer containing composition by dissolving a polynorbornene-based polymer in a mixed solvent containing a high-boiling solvent and a low-boiling solvent, with a difference in boiling points of the two solvents of 20° C. or greater and an amount of the high-boiling solvent being 0.1 to 15 wt % based on the weight of the polynorbornene-based polymer; casting and partially drying the composition to obtain a polynorbornene-based film containing 1 to 6 wt % of the mixed solvent based on the total weight of the polynorbornene-based film; and biaxially stretching the partially dried film in two directions parallel with the surface of the film at a stretching temperature less than or equal to the boiling point of the high-boiling solvent +20° C. and drying the stretched film at a temperature greater than or equal to the boiling point of the high-boiling solvent.

According to another aspect of the present invention, there is provided an integrated optical compensation polarizer including: a biaxial-optical compensation film composed of an addition-type polynorbornene-based polymer, in which, when $n_x$ is a refractive index in a slow direction (x-direction) in-plane of film, $n_y$ is a refractive index in a y-direction which is perpendicular to the x-direction in-plane of film, $n_z$ is a refractive index in a film thickness direction (z-direction), and $N_z=(n_x-n_z)/(n_x-n_y)$, the film satisfies the two requirements of $n_x>n_y>n_z$ and $1 \leq N_z \leq 10$; and a polarizer composed of polyvinylalcohol (PVA), which is laminated with polynorbornene biaxial optical compensation film and contains iodine and/or a dichroic dye.

According to another aspect of the present invention, there is provided a method of manufacturing an integrated optical compensation polarizer, including: preparing a polynorbornene-based polymer containing composition by dissolving a polynorbornene-based polymer in a mixed solvent containing a high-boiling solvent and a low-boiling solvent, with a difference in boiling points of the two solvents of 20° C. or greater and an amount of the high-boiling solvent being 0.1 to 15 wt % based on a weight of the polynorbornene-based polymer, casting and partially drying the composition to obtain a polynorbornene-based film containing 1 to 6 wt % of the mixed solvent based on the total weight of the polynorbornene-based film; uniaxially stretching the partially dried film in a transverse direction at a stretching temperature less than or equal to the boiling point of the high-boiling solvent +20° C. and drying the stretched film at a temperature greater than or equal to the boiling point of the high-boiling solvent; and locating the polynorbornene-based film having an optical axis in a transverse direction and a polarizing film having an absorption axis in a machine-direction such that the optical axis is perpendicular to the absorption axis and laminating them using a roll-to-roll lamination method.

According to another aspect of the present invention, there is provided a method of manufacturing an integrated optical compensation polarizer, including: preparing a polynorbornene-based polymer containing composition by dissolving a polynorbornene-based polymer in a mixed solvent containing a high-boiling solvent and a low-boiling solvent, with a difference in boiling points of the two solvents of 20° C. or greater and an amount of the high-boiling solvent being 0.1 to 15 wt % based on the weight of the polynorbornene-based polymer; casting and partially drying the composition to obtain a polynorbornene-based film containing 1 to 6 wt % of the mixed solvent based on the total weight of the polynorbornene-based film; uniaxially stretching the partially dried film in a machine direction at a stretching temperature less than or equal to the boiling point of the high-boiling solvent +20° C. and drying the stretched film at a temperature greater than or equal to the boiling point of the high-boiling solvent; and rotating the polynorbornene-based film having an optical axis in a machine-direction by 90 degrees and locating the polynorbornene-based film and a polarizing film having an absorption axis in a machine direction such that the optical axis is perpendicular to the absorption axis and laminating them. If an addition-type polynorbornene based film has a negative birefringence, i.e., the refractive index of stretching direction is smaller than the transverse direction of film, it can be roll-to-roll laminated without rotation by 90 degrees.

In the method of manufacturing the biaxial-optical polynorbornene-based film and the method of manufacturing the integrated optical compensation polarizer, the mixed solvent may further include 0.1 to 200 wt % of a solvent having a boiling point between the boiling point of the high-boiling solvent and the boiling point of the low-boiling solvent based on the weight of the polynorbornene-based polymer.

According to another aspect of the present invention, there is provided a liquid crystal display panel including: a liquid crystal cell; a biaxial-optical compensation film formed on a first surface of the liquid crystal cell; a first protective film formed on the compensation film; a first polarizer formed on the first protective film; a second protective film formed on the first polarizer, a third protective film formed on a second surface of the liquid cell; a second polarizer formed on the third protective film; and a fourth protective film formed on the second polarizer, in which the biaxial-optical compensation film is composed of an addition-type polynorbornene-based polymer; and when $n_x$ is a refractive index in an x-direction in-plane of film, $n_y$ is a refractive index in a y-direction which is perpendicular to the x-direction in-plane of film, $n_z$ is a refractive index in a film thickness direction (z-direction), and $N_z=(n_x-n_z)/(n_x-n_y)$, the biaxial-optical compensation film satisfies the two requirements of $n_x>n_y>n_z$ and $1 \leq N_z \leq 10$. In the liquid crystal display panel, the film and the polarizer may be laminated with an adhesive, and the biaxial-optical compensation film and the third protective film may be attached to the liquid cell with an pressure sensitive adhesive. This is also applied to the following aspects.

According to another aspect of the present invention, there is provided a liquid crystal display panel including: a liquid crystal cell; an integrated optical compensation polarizer formed on a first surface of the liquid crystal cell, which consists of a biaxial-optical compensation film adjacent to the liquid crystal cell, which also acts as a first protective film, and a first polarizer formed on the biaxial-optical compensation film; a second protective film formed on the first polarizer, a third protective film formed on a second surface of the liquid cell; a second polarizer formed on the third protective film; and a fourth protective film formed on the second polarizer, in which the biaxial-optical compensation film is composed of an addition-type polynorbornene-based polymer; when $n_x$ is a refractive index in an x-direction in-plane of film, $n_y$ is a refractive index in a y-direction which is perpendicular to the x-direction in-plane of film, $n_z$ is a refractive index in a film thickness direction (z-direction), and $N_z=(n_x-n_z)/(n_x-n_y)$, the biaxial-optical compensation film satisfies the two requirements of $n_x>n_y>n_z$ and $1 \leq N_z \leq 10$; and the first polarizer is composed of polyvinyl alcohol (PVA) comprising iodine or a dichroic dye.

According to another aspect of the present invention, there is provided a liquid crystal display panel including: a liquid crystal cell; a first protective film formed on a first surface of the liquid crystal cell; a first polarizer formed on the first protective film; a second protective film formed on the first polarizer, a biaxial-optical compensation film formed on a second surface of the liquid crystal cell; a third protective film formed on the biaxial-optical compensation film; a second polarizer formed on the third protective film; and a fourth protective film formed on the second polarizer, in which the biaxial-optical compensation film is composed of an addition-type polynorbornene-based polymer, and when $n_x$ is a refractive index in an x-direction in-plane of film, $n_y$ is a refractive index in a y-direction which is perpendicular to the x-direction in-plane of film, $n_z$ is a refractive index in a film thickness direction (z-direction), and $N_z=(n_x-n_z)/(n_x-n_y)$, the biaxial-optical compensation film satisfies the two requirements of $n_x>n_y>n_z$ and $1 \leq N_z \leq 10$.

According to another aspect of the present invention, there is provided a liquid crystal display panel including: a liquid crystal cell; a first biaxial-optical compensation film formed on a first surface of the liquid crystal cell; a first protective film formed on the first biaxial-optical compensation film; a first polarizer formed on the first protective film; a second protective film formed on the first polarizer, a second biaxial-optical compensation film formed on a second surface of the liquid crystal cell; a third protective film formed on the second biaxial-optical compensation film; a second polarizer formed on the third protective film; and a fourth protective film formed on the second polarizer, in which the first and second biaxial-optical compensation films are composed of an addition-type polynorbornene-based polymer, and when $n_x$ is a refractive index in an x-direction in-plane of film, $n_y$ is a refractive index in a y-direction which is perpendicular to the x-direction in-plane of film, $n_z$ is a refractive index in a film thickness direction (z-direction), and $N_z=(n_x-n_z)/(n_x-n_y)$, the first and second biaxial-optical compensation films satisfy the two requirements of $n_x>n_y>n_z$ and $1 \leq N_z \leq 10$.

According to another aspect of the present invention, there is provided a liquid crystal display panel including: a liquid crystal cell; a first protective film formed on a first surface of the liquid crystal cell; a first polarizer formed on the first protective film; a second protective film formed on the first polarizer; an integrated optical compensation polarizer formed on a second surface of the liquid crystal cell, which consists of a biaxial-optical compensation film adjacent to the liquid crystal cell, which also acts as a third protective film, and a second polarizer formed on the biaxial-optical compensation film; and a fourth protective film formed on the second polarizer, in which the biaxial-optical compensation film is composed of an addition-type polynorbornene-based polymer, and when $n_x$ is a refractive index in an x-direction in-plane of film, $n_y$ is a refractive index in a y-direction which is perpendicular to the x-direction in-plane of film, $n_z$ is a refractive index in a film thickness direction (z-direction), and $N_z=(n_x-n_z)/(n_x-n_y)$, the biaxial-optical compensation film satisfies the two requirements of $n_x>n_y>n_z$ and $1 \leq N_z \leq 10$; and the second polarizer is composed of polyvinyl alcohol (PVA) comprising iodine or a dichroic dye.

According to another aspect of the present invention, there is provided a liquid crystal display panel including: a liquid crystal cell; an integrated optical compensation polarizer formed on a first surface of the liquid crystal cell, which consists of a first biaxial-optical compensation film adjacent to the liquid crystal cell, which also acts as a first protective film, and a first polarizer formed on the first biaxial-optical compensation film; a second protective film formed on the first polarizer; an integrated optical compensation polarizer formed on a second surface of the liquid crystal cell, which consists of a second biaxial-optical compensation film adjacent to the liquid crystal cell, which also acts as a third protective film, and a second polarizer formed on the second biaxial-optical compensation film; and a fourth protective film formed on the second polarizer, in which the first and second biaxial-optical compensation films are composed of an addition-type polynorbornene-based polymer; when $n_x$ is a refractive index in an x-direction in-plane of film, $n_y$ is a refractive index in a y-direction which is perpendicular to the x-direction in-plane of film, $n_z$ is a refractive index in a film thickness direction (z-direction), and $N_z=(n_x-n_z)/(n_x-n_y)$, the first and second biaxial-optical compensation films satisfy the two requirements of $n_x>n_y>n_z$ and $1 \leq N_z \leq 10$; and the first and second polarizers are composed of polyvinyl alcohol (PVA) including iodine or a dichroic dye.

In the liquid crystal display panels according to aspects of the present invention, the protective films can be any of tri-acetate cellulose (TAC) films, ring opening polymerized polynorbornene-based films, HROMP polymers obtained by hydrogenating a ring opening polymerized cyclic olefinic polymer, polyester films, or addition-polymerized polynorbornene-based films. The polynorbornene-based film may include a biaxial-optical polynorbornene-based film, a uniaxial optical polynorbornene-based film, or an unstretched polynorbornene-based film. In addition, any transparent polymer film may be used as the protective film. Since the polynorbornene-based film has better durability under a high humidity than the TAC film, when it is used as the protective film, it can be laminated on the PVA polarizer without acid or alkaline treatment on the surface thereof, thereby simplifying the manufacturing process of the polarizer. In the liquid crystal display panels according to aspects of the present invention, the arrangement of the polarizers, the protective films, and the compensation films is not restricted to structures as described above and all configurations known in the art can be employed.

In the liquid crystal display panels according to aspects of the present invention, the polarizers may be a PVA film including iodine or a dichroic dye.

In the liquid crystal display panels according to aspects of the present invention, the refractive index of the liquid crystal cell may preferably satisfy the requirement of $n_x \approx n_y < n_z$ in on or off of voltage. This indicates a liquid crystal mode that has a birefringence in a mirror image of a negative birefringence, i.e., the refractive index value of the thickness direction is less than those of plane directions of a polynorbornene addition polymer film.

The first and the second biaxial-optical compensation films composed of the addition-type polynorbornene-based polymer may preferably be used in a vertical alignment (VA) mode liquid crystal display panel. In this case, the efficiency of compensating the optical phase retardation due to the birefringence of the liquid crystal layer is improved.

According to the method of manufacturing a biaxial-optical polynorbornene-based film of the present invention, a biaxial-optical film having both in-plane retardation and retardation in a thickness direction can be manufactured by uniaxially stretching the polynorbornene-based polymer having an inherent birefringence in a thickness direction. Thus, the manufacturing process of the biaxial-optical film can be simplified and an increased range of the retardation value can also be obtained. Further, one polynorbornene-based biaxial-optical film according to the present invention can replace two conventional uniaxial optical compensation films, i.e., an A-plate and a negative C-plate. When the polynorbornene-based film is used as a protective film of the PVA polarizer, an A-plate, a negative C-plate, and a protective film of the PVA polarizer can be replaced by one polynorbornene-based film according to the present invention. Thus, the present invention remarkably facilitates a reduction in the thickness of a liquid crystal display panel and a simplified production process. In addition, it is efficient to stretch the polynorbornene-based film in a transverse direction since a continuous roll-to-roll lamination process with a PVA polarizer can be used when an integrated optical compensation polarizer is manufactured. Furthermore, according to the manufacturing method of the present invention, the addition-type polynorbornene film is stretched at a temperature much less than the glass transition temperature of the addition-type polynorbornene-based polymer, thereby preventing the addition-type polynorbornene-based stretched film from yellowing.

BRIEF DESCRIPTION OF THE DRAWING

The above and other features and advantages of the present invention will become more apparent by describing in detail exemplary embodiments thereof with reference to the attached drawings in which.

DETAILED DESCRIPTION OF THE INVENTION

Figure 1:
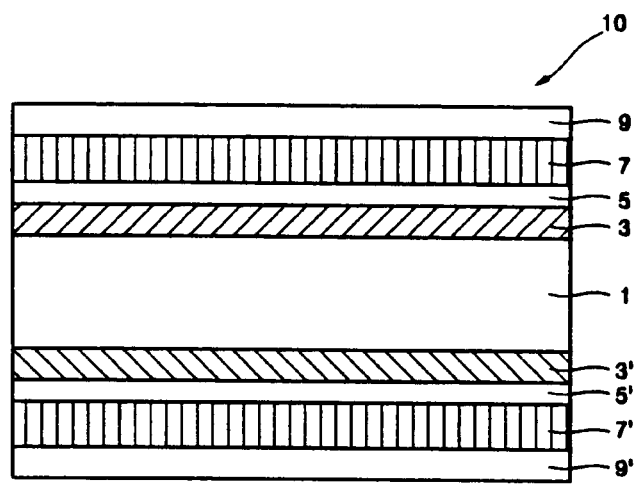
FIG. 1 is a schematic cross-sectional view of a conventional liquid crystal display device.

A method of manufacturing a biaxial-optical polynorbornene-based film according to an embodiment of the present invention will now be described in more detail.

According to the current embodiment of the present invention, a biaxial-optical polynorbornene-based film is manufactured by only uniaxial stretching. In this method, two uniaxial optical compensation films, i.e., an A-plate and a C-plate can be substituted by one biaxial-optical compensation film manufactured according to the current embodiment of the present invention.

First, a polynorbornene-based polymer is dissolved in a mixed solvent including a high-boiling solvent and a low-boiling solvent to prepare a polynorbornene-based polymer containing composition. The mixed solvent may further include a small amount of at least one solvent having a boiling point between the boiling point of the high-boiling solvent and the boiling point of the low-boiling solvent.

The high-boiling solvent has preferably a boiling point of 100-180° C., and more preferably a boiling point of 100-160° C., but is not particularly limited thereto. The high-boiling solvent reduces nonuniformity of the retardation value of the compensation film which tends to occur due to stretching. Examples of the high-boiling solvent include cyclohexanone, xylene, anisole, chlorobenzene, toluene, ethyl toluene, mesitylene, 1-butanol, propylene dichloride, ethylene trichloride, and the like, but are not limited thereto. These solvents can be used alone or in a combination of two or more.

The low-boiling solvent has preferably a boiling point of 35-115° C. and is added to improve the productivity of film. When a stretching temperature is similar to or greater than the boiling point of the low-boiling solvent, variation in the modulus of the partially dried film due to volatilization of solvent can be minimized and a uniform in-plane retardation value can be obtained as the content of the low-boiling solvent in the partially dried film is reduced. Examples of the low-boiling solvent include methylene chloride, toluene, dliso-propyl ether, dimethoxymethane, tetrahydrofurane, dioxane, chloroform, acetone, methylethylketone, ethyl formate, methyl acetate, ethyl acetate, propyl acetate, benzene and the like, but are not limited thereto. These solvents can be used alone or in a combination of two or more. It is preferred to select the low-boiling solvent having a boiling point of 35 to 115° C. as well as having a boiling point of at least 20° C., preferably 40° C. less than that of the high-boiling solvent in view of implementation of a uniform in-plane retardation value. The boiling point range of the low-boiling solvent overlaps with the boiling point range of the high-boiling solvent. It means that, for example, a solvent such as toluene can be a high-boiling solvent or a low-boiling solvent according to a combination with another solvent.

Since the high-boiling solvent present in a film can significantly affect the retardation value even in a small amount, it is used with the low-boiling solvent. The content of the high-boiling solvent is adjusted to be 0.1-15 wt %, preferably 1-12 wt %, and more preferably 2-12 wt % based on the weight of the polynorbornene-based polymer. When the content of the high-boiling solvent is less than 0.1 wt %, the effect of containing the high-boiling solvent to reduce nonuniformity of the retardation value is insignificant. When the content of the high-boiling solvent is greater than 15 wt %, the obtained compensation film is not sufficiently dried, and thus can be foamed or peeled off when being attached to a liquid crystal cell under high temperature and high humidity conditions and it is difficult to manufacture.

The mixed solvent may further include 0.1-200 wt %, preferably 0.1-100 wt % of at least one solvent having a boiling point between the boiling point of the high-boiling solvent and the boiling point of the low-boiling solvent based on the weight of the polynorbornene-based polymer. In this case, smaller thermal stress is applied to the film upon drying due to a progressive increase in drying temperature, thereby providing the finally dried film with better thermal stability, moisture stability and dimensional stability.

The composition may include additives such as a filler, a plasticizer, an antioxidant, a photostabilizer and/or an antistatic agent known in the art in order to improve mechanical strength, thermal stability, light stability, and manageability of a film, if necessary.

The polynorbornene-based polymer is not particularly restricted, but may be a homopolymer or copolymer obtained by addition-polymerizing one or more norbornene-based monomers represented by formula (1). A preparation method of the polynorbornene-based polymer via addition-polymerization of the norbornene-based monomer is described in detail in Korean Patent Laid-Open Publication Nos. 2004-0005594, 2004-0045108 and 2004-0049946.

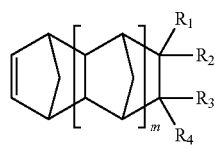
(1)

where m is an integer of 0-4; and each of $R_1$, $R_2$, $R_3$, and $R_4$ can be the same or different and is a hydrogen atom, a halogen atom, a linear or branched alkyl, alkenyl, or vinyl having 1-20 carbon atoms, a hydrocarbon-substituted or unsubstituted cycloalkyl having 5-12 carbon atoms, a hydrocarbon-substituted or unsubstituted aryl having 6-40 carbon atoms, a hydrocarbon-substituted or unsubstituted aralkyl having 7-15 carbon atoms, an alkynyl having 3-20 carbon atoms, a linear or branched haloalkyl, haloalkynyl, or halovinyl having 1-20 carbon atoms, a hydrocarbon-substituted or unsubstituted halocycloalkyl having 5-12 carbon atoms, a hydrocarbon-substituted or unsubstituted haloaryl having 6-40 carbon atoms, a hydrocarbon-substituted or unsubstituted haloaralkyl having 7-15 carbon atoms, a haloalkynyl having 3-20 carbon atoms, or a polar group containing at least one oxygen, nitrogen, phosphorous, sulfur, silicon, or boron atom.

$R_1$ and $R_2$, or $R_3$ and $R_4$ can be connected to each other to form an alkylidene group having 1-10 carbon atoms, and $R_1$ or $R_2$ can be connected to any one of $R_3$ and $R_4$ to form a saturated or unsaturated cyclic group having 4-12 carbon atoms, or an aromatic cyclic compound having 6-24 carbon atoms.

Specific examples of the polar group containing at least one oxygen, nitrogen, phosphorous, sulfur, silicon, or boron atom include —C(=O)$OR_6$, —$R_5$C(=O)$OR_6$, —$OR_6$, —$R_5OR_6$, —OC(O)$OR_6$, —$R_5$OC(=O)$OR_6$, —C(=O)$R_6$, —$R_5$C(O)Re, —OC(=O)$R_6$, —$R_5$OC(=O)$R_6$, —($R_5$O)p-$OR_6$, —($OR_5$)p-$OR_6$, —C(=O)—O—C(O)$R_6$, —$R_5$C(=O)—O—C(=O)$R_6$, —$SR_6$, —$R_5SR_6$, —$SSR_6$, —$R_5SSR_6$, —S(=O)$R_6$, —$R_5$S(=O)$R_6$, —$R_5$C(=S)$R_6$, —$R_5$C(=S)$SR_6$, —$R_5SO_3R_6$, —$SO_3R_6$, —$R_5$N=C=S, —NCO, $R_5$—NCO, —CN, —$R_5$CN, —NNC(=S)$R_6$, —$R_5$NNC(=S)$R_6$, —$NO_2$, and —$R_5NO_2$, —C(=O)N($R_6$)($R_7$), —$R_5$C(=O)N($R_6$)($R_7$), —Si($R_6$)($R_7$)($R_8$), —$R_5$Si($R_6$)($R_7$)($R_8$), —Si($OR_6$)($OR_7$)($OR_6$), —$R_5$Si($OR_6$)($OR_7$)($OR_8$), —N($R_6$)($R_7$), —$R_5$N($R_6$)($R_7$), —OC(=O)N($R_6$)($R_7$), —B($R_6$)($R_7$), —B($OR_6$)($OR_7$), —$R_5$B($OR_6$)($OR_7$), —P($OR_6$)($OR_7$), —$R_5$P($OR_6$)($OR_7$), —P(=O)($OR_6$)($OR_7$), —$R_5$P(=O)($OR_6$)($OR_7$), —OP(=O)($OR_6$)($OR_7$), and —$OR_5$P(=O)($OR_6$)($OR_7$), but are not limited thereto.

In above formulae, $R_5$ is a linear or branched alkyl, haloalkyl, alkenyl, haloalkenyl, or halovinyl having 1-20 carbon atoms, a hydrocarbon-substituted or unsubstituted cycloalkyl or halocycloalkyl having 4-12 carbon atoms, a hydrocarbon-substituted or unsubstituted aryl or haloaryl having 6-40 carbon atoms, a hydrocarbon-substituted or unsubstituted aralkyl or haloaralkyl having 7-15 carbon atoms, or an alkynyl or haloalkynyl having 3-20 carbon atoms; each of $R_6$, $R_7$, and $R_8$ is a hydrogen atom, a halogen atom, a linear or branched alkyl, haloalkyl, alkenyl, haloalkenyl, halovinyl, alkoxy, haloalkoxy, carbonyloxy, or halocarbonyloxy having 1-20 carbon atoms, a hydrocarbon-substituted or unsubstituted cycloalkyl or halocycloalkyl having 4-12 carbon atoms, a hydrocarbon-substituted or unsubstituted aryl, haloaryl, aryloxy, or haloaryloxy having 6-40 carbon atoms, a hydrocarbon-substituted or unsubstituted aralkyl or haloaralkyl having 7-15 carbon atoms, or an alkynyl or haloalkynyl having 3-20 carbon atoms; and p is an integer of 1-10.

The polynorbornene-based polymer used in the present invention has optical anisotropy since a bulky hydrocarbon ring has an extended conformation. Due to the introduction of a polar group into the polynorbornene-based polymer having an extended conformation, intermolecular interaction increases. Thus, intermolecular packing has a directional order, and thus optical anisotropy further increases. In addition, the polynorbornene-based polymer has high adhesive force to a PVA polarizer due to increased surface tension, and thus is suitable for the fabrication of an integrated optical compensation polarizer.

Then, the composition is cast on a substrate to form a polynorbornene-based film. The substrate is not particularly restricted, but may be a mirror polished metal belt or a glass plate. The surface temperature of such a substrate may be less than or equal to room temperature. The film is partially dried on the substrate. This partial drying process includes a first partial drying step in which the film is dried at a temperature less than the boiling point of the low-boiling solvent +20° C. and a second partial drying step in which the film is dried at a temperature greater than or equal to the boiling point of the low-boiling solvent and less than or equal to the boiling point of the high-boiling solvent. When the first partial drying step is performed at a temperature greater than or equal to the boiling point of the low-boiling solvent, craters can be formed on the film due to evaporation of the low-boiling solvent. When the second partial drying step is performed at a temperature less than the boiling point of the low-boiling solvent, uniform stretching is difficult due to a high content of solvent remaining in the film. Further, when the second partial drying step is performed at a temperature greater than the boiling point of the high-boiling solvent, craters can be formed on the film and uniform stretching is difficult. Due to the partial drying process, the content of the mixed solvent is adjusted to be 1-6 wt % based on the weight of the polymer. When the content of the mixed solvent is less than 1 wt %, stretching in the subsequent process is difficult and when the content of the mixed solvent is greater than 6 wt %, the film tends to be wrinkled in a subsequent stretching process and uniform stretching is difficult. Although the second partial drying step is preferably performed after the film on the substrate is peeled off, it can be performed before peeling off the film when the length of the mirror polished substrate is sufficiently long.

Figure 2:
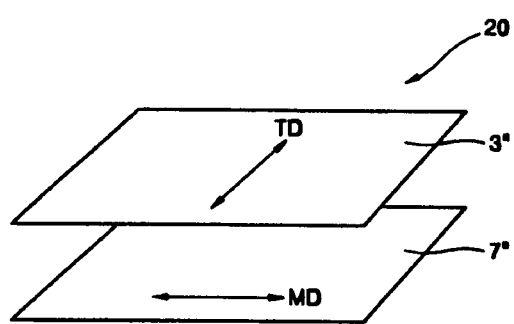
FIG. 2 schematically illustrates a situation in which a biaxially-optical polynorbornene-based film according to embodiments of the present invention and a polarizer are laminated during a continuous process of manufacturing an integrated optical compensation polarizer.
Figure 3:
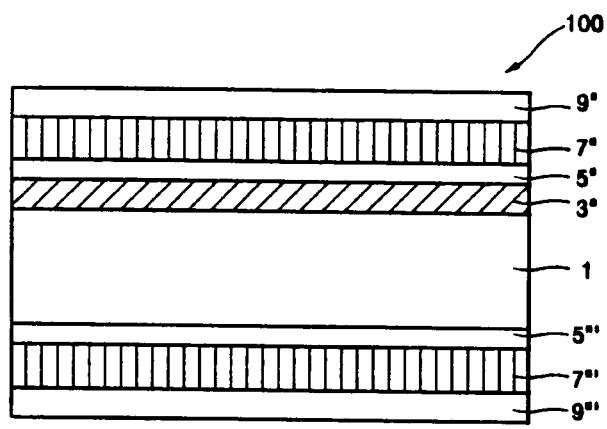
FIG. 3 is a schematic cross-sectional view of a liquid crystal display panel according to an embodiment of the present invention.
Figure 4:
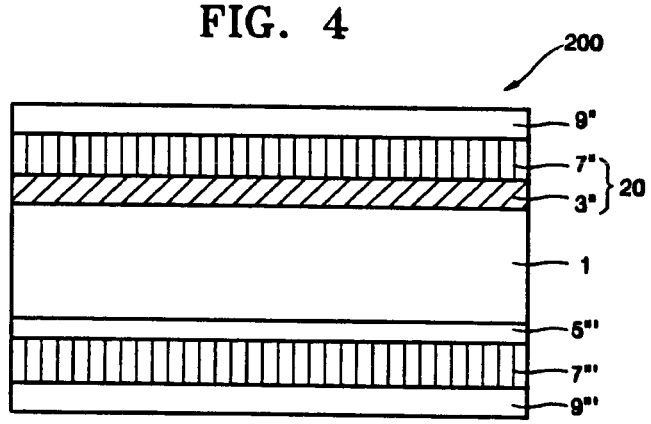
FIG. 4 is a schematic cross-sectional view of a liquid crystal display panel according to another embodiment of the present invention.
Figure 5:
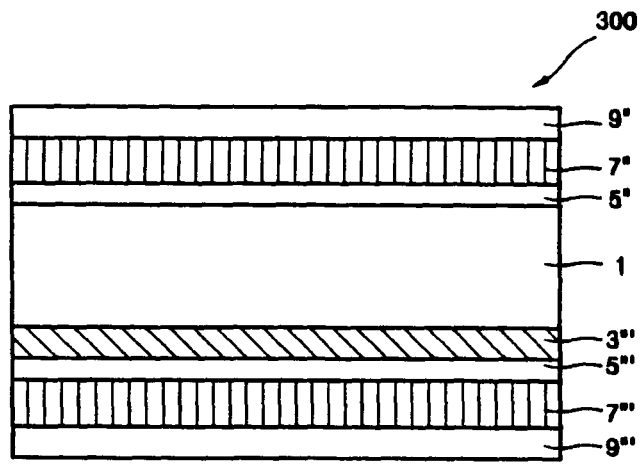
FIG. 5 is a schematic cross-sectional view of a liquid crystal display panel according to another embodiment of the present invention.
Figure 6:
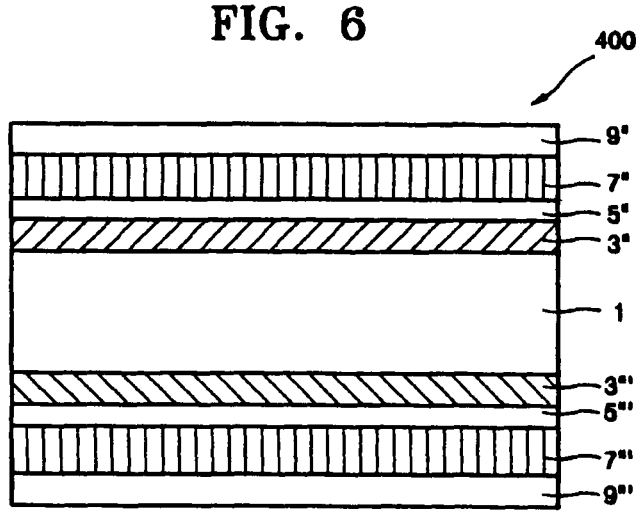
FIG. 6 is a schematic cross-sectional view of a liquid crystal display panel according to another embodiment of the present invention.
Figure 7:
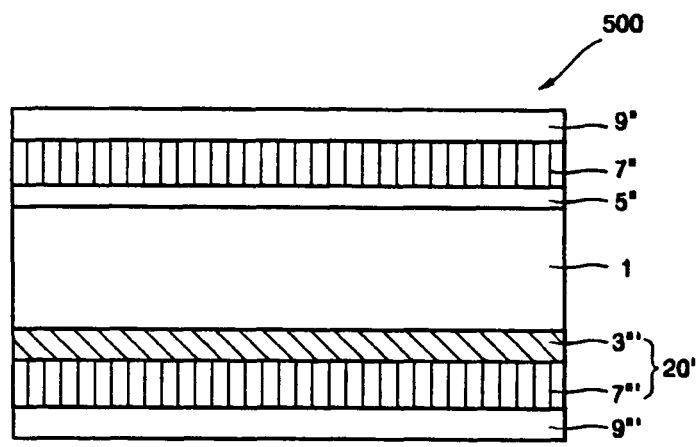
FIG. 7 is a schematic cross-sectional view of a liquid crystal display panel according to another embodiment of the present invention.
Figure 8:
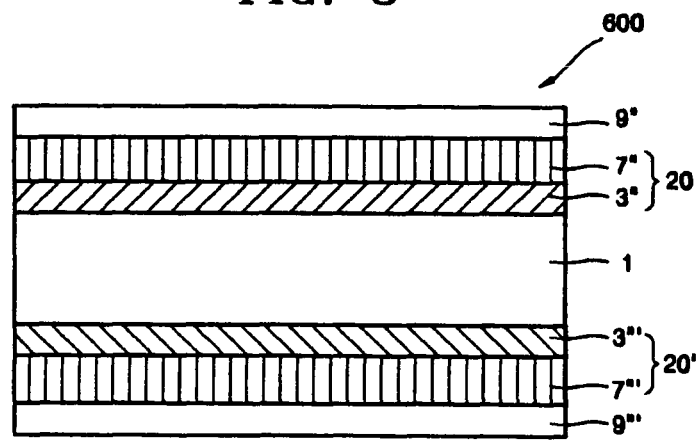
FIG. 8 is a schematic cross-sectional view of a liquid crystal display panel according to another embodiment of the present invention.

Subsequently, the partially dried film is uniaxially stretched using a tenter in one direction parallel with the film surface at a stretching temperature less than or equal to the boiling point of the high-boiling solvent +20° C., preferably at a stretching temperature ranging from the boiling point of the high-boiling solvent −100° C. to the boiling point of the high-boiling solvent +20° C. The tenter used is a general transverse direction drawing tenter in which a pin-type or clip-type grip runs on a rail, but is not limited thereto. If necessary, a nip-roll type machine direction drawing tenter can be used. A stretching ratio is adjusted to be about 1.01-2 folds. Since the polynorbornene-based polymer has intrinsic birefringence characteristics, it can be used as a negative C-plate having a negative birefringence in a thickness direction. Thus, when the polynorbornene-based film is stretched in one direction parallel to the film plane to bring about in-plane retardation, a biaxial-optical film can be obtained by only uniaxial stretching. However, if necessary, the biaxial-optical film can be manufactured by performing biaxial stretching such as a two step stretching method such as transverse direction (TD) stretching after machine direction (MD) stretching or MD stretching after TD stretching, or co-biaxial stretching in order to improve mechanical properties of the film. Such a biaxial-optical film can function as both the negative C-plate and the A-plate. It is preferable to uniaxially stretch the film in a transverse direction of the film in view of ease of manufacturing an integrated optical compensation polarizer by laminating the film on a polarizer. Referring to FIG. 2, it will now be described in more detail.

FIG. 2 schematically illustrates a situation in which a polynorbornene-based compensation film 3" manufactured according to an embodiment of the present invention and a polarizer 7" are laminated. In an integrated optical compensation polarizer 20 for a VA liquid crystal display panel, the optical axis of the compensation film 3" and the absorption axis of the polarizer 7" should be perpendicular to each other. When the polynorbornene-based film 3" is manufactured using a clip-type TD tenter using the manufacturing method of the present invention, it is stretched in a transverse direction (cross machine-direction) to have an optical axis in the same direction. In this case, when the TD stretched biaxial-optical polynorbornene film is laminated on the PVA polarizer 7" having an MD absorption axis as a protective film of the polarizer, if both films are located in a machine-direction in a roll-to-roll state, the optical axis of the compensation film 3" and the absorption axis of the polarizer are perpendicular to each other. Thus, the polynorbornene-based film and the PVA polarizer 7" from separate rolls are directly laminated using a continuous roll-to-roll lamination process to manufacture an integrated optical compensation polarizer.

In a method of manufacturing an integrated optical compensation polarizer according to another embodiment of the present invention, contrary to the previous method, a MD uniaxially stretched biaxial-optical polynorbornene-based film is rotated by 90 degrees, and is then laminated on a polarization film having an MD absorption axis to manufacture an integrated optical compensation polarizer for a VA liquid crystal display panel.

In the integrated optical compensation polarizer manufactured in this way, the polynorbornene-based film can function as a negative C-plate, an A-plate, and a protective film for the polarizer, thereby facilitating the production of a thin liquid crystal display panel and a simplified manufacturing process.

The polarizer used in the present invention may be manufactured by dyeing the PVA film with iodine or a dichroic dye and the manufacturing method thereof is not particularly restricted. The polarizer can be laminated using an adhesive. That is, the polynorbornene-based film or the PVA film is first coated with an adhesive using a roll coater, a gravure coater, a bar coater, a knife coater, or a capillary coater. Before the adhesive is completely dried, the polynorbornene-based film and the polarizer are laminated by hot pressing or cold pressing with a lamination roll. However, when a hot-melt adhesive is used, a hot pressing roll should be used. A usable adhesive can be a PVA adhesive, a polyurethane adhesive, an epoxy adhesive, a styrene butadiene rubber (SBR) adhesive, or a hot melt adhesive, but is not limited thereto. When the polyurethane adhesive is used, it may preferably be an adhesive prepared using an aliphatic isocyanate compound which is not yellowed by light. When a one-component or two-components adhesive for dry laminate is used or reactivity of an isocyanate with hydroxy group is relatively low, a solution adhesive diluted with acetate, ketone, ether, or an aromatic solvent can be used. The viscosity of adhesive is preferably less than 5000 cps. A SBR adhesive, a two-part type epoxy adhesive, etc. can also be used. These adhesives may have better storage stability and light transmittance of 90% or greater at 400-800 nm.

If a pressure-sensitive adhesive can show sufficient adhesive strength, it can also be used. Preferably, the pressure-sensitive adhesive is sufficiently cured by heat or ultraviolet radiation after lamination to increase the mechanical strength thereof to the level of the adhesive such that its adhesive strength is too high to peel it off without destroying one or both sides of film to which the pressure-sensitive adhesive is attached. Specific examples of usable pressure-sensitive adhesive include natural rubber, synthetic rubber or elastomer, vinyl chloride/vinyl acetate copolymer, polyvinylalkylether, polyacrylate, and modified polyolefinic pressure-sensitive adhesive, which have good optical transparency, and hardened pressure-sensitive adhesives produced by adding a hardener thereto.

To improve adhesive strength of the polynorbornene-based film, its surface may be coated with a primer layer or pretreated using corona discharge, plasma discharge, ion beam irradiation, etc.

TAC as a protective film for polarizer, widely used at present as described above is a good protector for polarizer, but has a relatively high moisture absorption property, resulting in light leakage and reduction in the degree of polarization under high temperature and high humidity conditions and deterioration of durability. However, when the polynorbornene-based compensation film is used as a protective film for polarizer, as in the present invention, light leakage and reduction in the degree of polarization under high temperature and high humidity conditions is prevented and durability is improved in comparison when TAC is used as the protective film.

As described above, in the method of manufacturing a polynorbornene-based film according to an embodiment of the present invention, the partially dried film is stretched at a temperature less than or equal to the boiling point of the high-boiling solvent +20° C., preferably at a temperature ranging from the boiling point of the high-boiling solvent −100° C. to the boiling point of the high-boiling solvent +20° C., more preferably at a temperature ranging from the boiling point of the high-boiling solvent −80° C. to the boiling point of the high-boiling solvent. This stretching temperature is usually in a relatively low stretching temperature range less than 200° C. According to the current embodiment of the present invention, generation of a conjugated double bond due to pyrolysis is prevented, thereby obtaining high transmittance and a uniform in-plane retardation value.

Subsequently, the stretched film is dried at a temperature greater than or equal to the boiling point of the high-boiling solvent until the amount of residual mixed solvent is less than 1 wt %, to obtain a biaxial-optical polynorbornene-based film.

When $n_x$ is a refractive index in an x-direction (stretching direction) in-plane of film, $n_y$ is a refractive index in a y-direction which is perpendicular to the x-direction in-plane of film, $n_z$ is a refractive index in a thickness direction (z-direction), and $N_z=(n_x-n_z)/(n_x-n_y)$, the obtained biaxial-optical polynorbornene-based compensation film satisfies the two requirements of $n_x>n_y>n_z$ and $1 \leq N_z \leq 10$.

The in-plane retardation value, $R_{in}$, of the polynorbornene-based compensation film can be adjusted by changing the stretching condition. That is, $R_{in}$ tends to increase when the stretching ratio increases and $R_{in}$ tends to decrease when the content of solvent increases.

The retardation value, $R_{th}$, of the polynorbornene-based compensation film in a thickness direction can be adjusted by changing the molecular structure of the polynorbornene-based polymer and the stretching conditions. First, regarding the effects of the molecular structure of the polynorbornene-based polymer on $R_{th}$, when a polar group including an ester group, an acetyl group, an alkoxy group, an amino group, a hydroxyl group, a carbonyl group, or a halogen atom is introduced into the norbornene-based monomer represented by formula (1), the absolute value of $R_{th}$ tends to increase. Further, when the content of such a polar group increases, the absolute value of $R_{th}$ further increases. In addition, when a norbornene-based monomer represented by formula (1) having a high value of m is used, the length of substituent is reduced by reducing the number of carbon atoms of $R_1$, $R_2$, $R_3$, $R_4$, and $R_5$, which determines the length of substituent, or $R_1$ and $R_2$, or $R_3$ and $R_4$ can be connected to each other to form an alkylidene group having 1-10 carbon atoms, and $R_1$ or $R_2$ can be connected to any one of $R_3$ and $R_4$ to form a saturated or unsaturated cyclic group having 4-12 carbon atoms, or an aromatic cyclic compound having 6-24 carbon atoms, $R_{th}$ tends to increase. Regarding the effect of the stretching conditions of the polynorbornene-based polymer on $R_{th}$, when the stretching ratio, the content of solvent upon stretching, the stretching temperature, and the drying temperature after stretching and drying time increase, the absolute value of $R_{th}$ tends to decrease.

When the obtained biaxial-optical polynorbornene-based compensation film has a thickness of 100 μm, the $N_z$ value defined by Equation 3 is in the range of 1-50, preferably 1-10, and more preferably 1-6. The $R_{in}$ value is 300-500 nm, and preferably 50-200 nm. The $R_{th}$ value ranges from −50 nm to −500 nm, and preferably from −50 nm to −300 nm.

$$N_z=(n_x-n_z)/(n_x-n_y)=1-(R_{th}/R_{in}) \quad (3)$$

where $n_x$ is a refractive index in an x-direction (stretching direction) in-plane of film; $n_y$ is a refractive index in the direction perpendicular to the stretching direction in-plane of film (y-direction), and $n_z$ is a refractive index in a thickness direction (z-direction).

A liquid crystal display panel according to an embodiment of the present invention includes the biaxial-optical polynorbornene-based film and/or the integrated optical compensation polarizer disposed on an upper surface, a lower surface or both surfaces of a liquid crystal layer according to structures well-known in the art and a detailed structure thereof is illustrated in FIGS. 3 through 8, but is not limited thereto.

Hereinafter, the method of manufacturing the biaxial-optical polynorbornene-based film according to an embodiment of the present invention will be described in more detail with reference to the following Examples and Comparative Examples. However, these Examples are provided for illustrative purposes only and are not to be construed as limiting the scope of the invention.

Example 1

A butyl norbornene/5-norbornene-2-carboxylic acid butyl ester (molar ratio: 5/5) copolymer (PBu5-Be5 NB) was dissolved in a solvent system composed of methylene chloride (b.p. 39.8-40° C.) and cyclohexanone (b.p. 155.6° C.) In a weight ratio of 98:2 to obtain 18 wt % of a polymer solution. This solution was cast on a mirror polished steel sheet and partially dried at 30° C. for 1 hr. The resulting film was peeled from the steel sheet and partially dried again at 100° C. for 1.5 min. The thickness of the film and the content of solids were measured. As a result, the thickness of the film was about 105 μm and the content of solids was about 95.8%.

The film was uniaxially stretched using a clip-type grip at a stretching ratio of 1.4 folds at 75° C. The film was heated to 160° C. within 10 min while maintaining the stretching ratio and dried at the same temperature for 10 min. Next, the film was cooled to 70° C. and maintained at the same temperature for 2 min, and then tension was removed. The resulting unlaxially stretched PBu5-Be5 NB film had no defects such as wrinkles and craters, and thus its appearance was flawless.

Example 2

A butyl norbornene/5-norbornene-2-carboxylic acid butyl ester (molar ratio: 5/5) copolymer (PBu5-Be5 NB) was dissolved in a solvent system composed of toluene (b.p. 110.6° C.) and cyclohexanone (b.p. 155.6° C.) In a weight ratio of 97:3 to obtain 20 wt % of a polymer solution. This solution was cast on a mirror polished steel sheet and partially dried at room temperature for 1.5 hr. The resulting film was peeled from the steel sheet and partially dried again at 100° C. for 4 min. The thickness of the film and the content of solids were measured. As a result, the thickness of the film was about 108 μm and the content of solids was about 95.5%.

The film was uniaxially stretched using a clip-type grip, as used in Example 1, at a stretching ratio of 1.4 folds at 70° C. The film was heated to 160° C. within 10 min while maintaining the stretching ratio and dried at the same temperature for 10 min. Next, the film was cooled to 70° C. and maintained at the same temperature for 2 min, and then tension was removed. The resulting uniaxially stretched PBu5-Be5 NB film had no defects such as wrinkles or craters, and thus its appearance was flawless.

Example 3

A 5-norbornene-2-allylacetate/5-norbornene-2-carboxylic acid methyl ester (molar ratio: 7/3) copolymer (PAa7-Me3 NB) was dissolved in a solvent system composed of toluene (b.p. 110.6° C.) and cyclohexanone (b.p. 155.6° C.) In a weight ratio of 97:3 to obtain 20 wt % of a polymer solution. This solution was cast on a mirror polished steel sheet and partially dried at room temperature for 1.5 hr. The resulting film was peeled from the steel sheet and partially dried again at 100° C. for 8 min. The thickness of the film and the content of solids were measured. As a result, the thickness of the film was about 110 μm and the content of solids was about 96.0%.

The film was uniaxially stretched using a clip-type grip, as used in Example 1, at a stretching ratio of 1.2 folds at 90° C. The film was heated to 190° C. within 10 min while maintaining the stretching ratio and dried at the same temperature for 10 min. Next, the film was cooled to 70° C. and maintained at the same temperature for 2 min, and then tension was removed. The resulting uniaxially stretched PAa7-Me3 NB film had no defects such as wrinkles or craters, and thus its appearance was flawless.

Example 4

A 5-norbornene-2-allylacetate/butyl norbornene/5-norbornene-2-carboxylic acid methyl ester (molar ratio: 7/1.5/1.5) copolymer (PAa7-Bu1.5-Me1.5 NB) was dissolved in a solvent system composed of toluene (b.p. 110.6° C.) and cyclohexanone (b.p. 155.6° C.) In a weight ratio of 97:3 to obtain 20 wt % of a polymer solution. This solution was cast on a mirror polished steel sheet and partially dried at room temperature for 1.5 hr. The resulting film was peeled from the steel sheet and partially dried again at 100° C. for 10 min. The thickness of the film and the content of solids were measured. As a result, the thickness of the film was about 106 μm and the content of solids was about 96.2%.

The film was uniaxially stretched using a clip-type grip, as used in Example 1, at a stretching ratio of 1.2 folds at 95° C. The film was heated to 190° C. within 10 min while maintaining the stretching ratio and dried at the same temperature for 10 min. Next, the film was cooled to 90° C. and maintained at the same temperature for 2 min, and then tension was removed. The resulting uniaxially stretched PAa7-Bu1.5-Me1.5 NB film had no defects such as wrinkles or craters, and thus its appearance was flawless.

Example 5

A 5-norbornene-2-allylacetate/butyl norbornene/5-norbornene-2-carboxylic acid methyl ester (molar ratio: 7/1.5/1.5) copolymer (PAa7-Bu1.5-Me1.5 NB) was dissolved in a solvent system composed of toluene (b.p. 110.6° C.) and cyclohexanone (b.p. 155.6° C.) In a weight ratio of 98:2 to obtain 20 wt % of a polymer solution. This solution was cast on a mirror polished steel sheet and partially dried at 30° C. for 1.5 hr. The resulting film was peeled from the steel sheet and partially dried again at 100° C. for 5 min. The thickness of the film and the content of solids were measured. As a result, the thickness of the film was about 101 μm and the content of solids was about 96.8%.

The film was uniaxially stretched using a clip-type grip, as used in Example 1, at a stretching ratio of 1.05 folds at 110° C. The film was heated to 190° C. within 10 min while maintaining the stretching ratio and dried at the same temperature for 10 min. Next, the film was cooled to 90° C. and maintained at the same temperature for 2 min, and then tension was removed. The resulting uniaxially stretched PAa7-Bu1.5-Me1.5 NB film had no defects such as wrinkles or craters, and thus its appearance was flawless.

Comparative Example 1

A butyl norbornene/5-norbornene-2-carboxylic acid butyl ester (molar ratio: 5/5) copolymer (PBu5-Be5 NB) was dissolved in methylene chloride (b.p. 39.75° C.) to obtain 18 wt % of a polymer solution. This solution was cast on a mirror polished steel sheet and partially dried at 30° C. for 30 min. The resulting film was peeled from the steel sheet and the thickness of the film and the content of solids were measured. As a result, the thickness of the film was about 115 μm and the content of solids was about 95.8%.

During uniaxially stretching the film at a stretching ratio of 1.3 folds at 70° C., it was partially broken down. The film had wrinkles in a stretching direction and stains were observed due to nonuniformity of a retardation value when it was placed between polarizers in a crossed Nicol state.

Comparative Example 2

A butyl norbornene/5-norbornene-2-carboxylic acid butyl ester (molar ratio: 5/5) copolymer (PBu5-Be5 NB) was dissolved in toluene (b.p. 110.6° C.) to obtain 18 wt % of a polymer solution. This solution was cast on a mirror polished steel sheet and partially dried at room temperature for 1.5 hr. The resulting film was peeled from the steel sheet and partially dried again at 100° C. for 2 min. The thickness of the film and the content of solids were measured. As a result, the thickness of the film was about 108 μm and the content of solids was about 95.2%.

The film was uniaxially stretched using a clip-type grip, as used in Example 1, at a stretching ratio of 1.2 folds at 70° C. The film was heated to 160° C. within 10 min while maintaining the stretching ratio and dried at the same temperature for 10 min. Next, the film was cooled to 70° C. and maintained at the same temperature for 2 min, and then tension was removed. The film had wrinkles in a stretching direction and stains were observed due to non-uniformity of a retardation value when it was placed between polarizers in a crossed Nicol state.

Comparative Example 3

A butyl norbornene/5-norbornene-2-carboxylic acid butyl ester (molar ratio: 5/5) copolymer (PBu5-Be5 NB) was dissolved in a solvent system composed of methylene chloride (b.p. 39.75° C.) and cyclohexanone (b.p. 155.6° C.) In a weight ratio of 98:2 to obtain 18 wt % of a polymer solution. This solution was cast on a mirror polished steel sheet and partially dried at 30° C. for 1 hr. The resulting film was peeled from the steel sheet and partially dried again at 100° C. for 1 hr. The thickness of the film and the content of solids were measured. As a result, the thickness of the film was about 115 μm and the content of solids was about 99.2%.

During uniaxially stretching the film at a stretching ratio of 1.2 folds at 160° C., it was partially broken down. The film had wrinkles in a stretching direction and stains were observed due to non-uniformity of a retardation value when it was placed between polarizers in a crossed Nicol state.

Comparative Example 4

A butyl norbornene/5-norbornene-2-carboxylic acid butyl ester (molar ratio: 5/5) copolymer (PBu5-Be5 NB) was dissolved in a solvent system composed of toluene (b.p. 110.6° C.) and cyclohexanone (b.p. 155.6° C.) In a weight ratio of 97:3 to obtain 20 wt % of a polymer solution. This solution was cast on a mirror polished steel sheet and partially dried at 30° C. for 1 hr. The resulting film was peeled from the steel sheet and partially dried again at 100° C. for 2 min. The thickness of the film and the content of solids were measured. As a result, the thickness of the film was about 108 μm and the content of solids was about 93.0%.

The film was uniaxially stretched using a clip-type grip, as used in Example 1, at a stretching ratio of 1.3 folds at 70° C. The film was heated to 160° C. within 10 min while maintaining the stretching ratio and dried at the same temperature for 10 min. Next, the film was cooled to 70° C. and maintained at the same temperature for 2 min, and then tension was removed. The film had wrinkles in a stretching direction and stains were observed due to non-uniformity of a retardation value when it was placed between polarizers in a crossed Nicol state.

Comparative Example 5

A 5-norbornene-2-allylacetate/butyl norbornene/5-norbornene-2-carboxylic acid methyl ester (molar ratio: 7/1.5/1.5) copolymer (PAa7-Bu1.5-Me1.5 NB) was dissolved in a solvent system composed of toluene (b.p. 110.6° C.) and cyclohexanone (b.p. 155.6° C.) In a weight ratio of 97:3 to obtain 20 wt % of a polymer solution. This solution was cast on a mirror polished steel sheet and partially dried at room temperature for 1.5 hr. The resulting film was peeled from the steel sheet and partially dried again at 100° C. for 9 min. The thickness of the film and the content of solids were measured. As a result, the thickness of the film was about 115 μm and the content of solids was about 95%.

The film was uniaxially stretched using a clip-type grip, as used in Example 1, at a stretching ratio of 1.2 folds at 85° C. The film was heated to 190° C. within 10 min while maintaining the stretching ratio and dried at the same temperature for 10 min. Next, the film was cooled to 90° C. and maintained at the same temperature for 2 min, and then tension was removed.

The film had wrinkles in a stretching direction and stains were observed due to nonuniformity of a retardation value when it was placed between polarizers in a crossed Nicol state.

Comparative Example 6

A 5-norbornene-2-allylacetate/butyl norbornene/5-norbornene-2-carboxylic acid methyl ester (molar ratio: 7/1.5/1.5) copolymer (PAa7-Bu1.5-Me1.5 NB) was dissolved in a solvent system composed of toluene (b.p. 110.6° C.) and cyclohexanone (b.p. 155.6° C.) In a weight ratio of 97:3 to obtain 20 wt % of a polymer solution. This solution was cast on a mirror polished steel sheet and partially dried at room temperature for 1.5 hr. The resulting film was peeled from the steel sheet and partially dried again at 100° C. for 9 min. The thickness of the film and the content of solids were measured. As a result, the thickness of the film was about 115 μm and the content of solids was about 93.2%.

The film was uniaxially stretched using a clip-type grip, as used in Example 1, at a stretching ratio of 1.2 folds at 85° C. The film was heated to 190° C. within 10 min while maintaining the stretching ratio and dried at the same temperature for 10 min. During the drying process, the film was partially broken down. That is, comparing the film of Comparative Example 6 with the film of Comparative Example 5, when the solids content is low, i.e., the solvent content is high, partial breakage was observed during the drying of the film while maintaining the stretching ratio. The partially broken film had wrinkles in a stretching direction and stains were observed due to nonuniformity of a retardation value when it was placed between polarizers in a crossed Nicol state.

The uniaxially stretched films manufactured in Examples 1-5 and Comparative Examples 1-6 were evaluated for appearance and performance as follows.

Evaluation Example 1

Evaluation of Appearance

The uniaxially stretched films manufactured in Examples 1-5 and Comparative Examples 1-6 were evaluated for appearance with the naked eye. X represents the case where at least one of partial breakage, wrinkles and foaming is observed and O represents the case where all of said defects are not observed. Craters occur when bubbles are generated on the surface of film due to evaporation of solvent.

TABLE 1

|  | Partial breakage | Wrinkles | Craters |
| --- | --- | --- | --- |
| Example 1 | O | O | O |
| Example 2 | O | O | O |
| Example 3 | O | O | O |
| Example 4 | O | O | O |
| Example 5 | O | O | O |
| Comparative Example 1 | X | X | O |
| Comparative Example 2 | O | X | O |
| Comparative Example 3 | X | X | O |
| Comparative Example 4 | O | X | O |
| Comparative Example 5 | O | X | O |
| Comparative Example 6 | X | X | O |

Referring to Table 1, the polynorbornene-based films of Examples 1-5 of the present invention did not produce partial breakage, wrinkles, and craters. On the contrary, in the case of the films of Comparative Examples 1-6, wrinkles were generated and partial breakage was sometimes caused upon stretching in all films although craters were not caused.

Evaluation Example 2

Evaluation of In-Plane Retardation $R_{in}$, Retardation in a Thickness Direction $R_{th}$, and $N_z$ Value For the films of Examples 1-5, in-plane retardation $R_{in}$, retardation in a thickness direction $R_{th}$, and $N_z$ value were calculated. In-plane retardation $R_{in}$ and retardation in a thickness direction $R_{th}$ were measured with an automatic refractometer (available from Oji Scientific Instrument; KOBRA-21 ADH). The results are shown in Table 2.

TABLE 2

|  | Film thickness (nm) | $R_{in}$ (nm) | $R_{th}$ (nm) | $N_z$ |
| --- | --- | --- | --- | --- |
| Example 1 | 92 | 353 | −56 | 1.16 |
| Example 2 | 94 | 326 | −62 | 1.19 |
| Example 3 | 100 | 240 | −205 | 1.85 |
| Example 4 | 101 | 270 | −176 | 1.65 |
| Example 5 | 100 | 51 | −216 | 5.24 |

Referring to Table 2, the polynorbornene-based films according to the present invention had a negative $R_{th}$ value, which indicates that it can function as a negative C-plate. Further, absolute values of $R_{in}$ and $R_{th}$ are greater than 0 and similar to each other, which indicates that the films have biaxial-optical anisotropy.

Evaluation Example 3

Evaluation of Uniformity of Retardation as Index of Color Non-Uniformity

The films of Examples 1-5 and Comparative Examples 2, 4, and 5 were evaluated for uniformity of in-plane retardation as follows.

Samples (width: 100 mm, length: 200 mm) were taken from the central portion of the films and the in-plane retardation $R_{in}$ for 550 nm monochromatic light was measured at intervals of 20 mm in a width direction and 20 mm in a machine-direction. In Table 3, X represents the case where a difference of in-plane retardation values between two neighboring points is greater than 2% of their average retardation value and O represents the case where the difference is less than 2%.

TABLE 3

| | Example | | | | | Comparative Example | | |
|---|---|---|---|---|---|---|---|---|
| | 1 | 2 | 3 | 4 | 5 | 2 | 4 | 5 |
| $R_{in}$ | O | O | O | O | O | X | X | X |

Referring to Table 3, the polynorbornene-based film of Examples 1-5 of the present invention had a uniform in-plane retardation value. On the contrary, the films of Comparative Examples 2, 4, and 5 had nonuniform in-plane retardation values.

Evaluation Example 4

Evaluation of Viewing Angle

Figure 9:
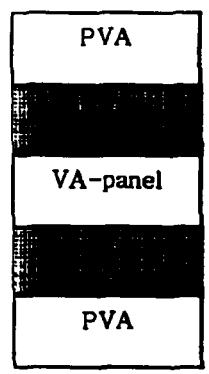
FIG. 9 is a schematic cross-sectional view of an asymmetric liquid crystal display panel having a PNB compensation film on only one surface of a liquid crystal cell according to an embodiment of the present invention.

An asymmetric liquid crystal display panel having a polynorbornene (PNB) compensation film on only one surface of a liquid crystal cell as illustrated in FIG. 9 was investigated for viewing angle characteristic via simulation.

Figure 10:
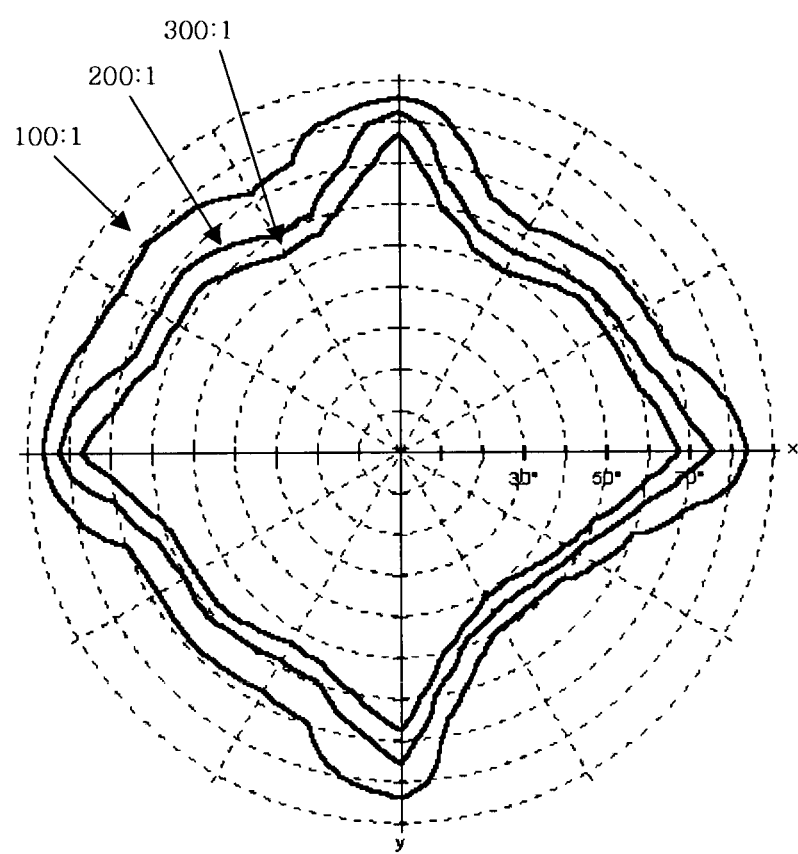
FIG. 10 illustrates a contrast ratio map simulated using the liquid crystal display panel of FIG. 9.

FIG. 10 illustrates a contrast ratio map simulated using the liquid crystal display panel of FIG. 9. When $R_{in}$ and $R_{th}$ of the PNB compensation film were adjusted to be 55 nm and −210 nm, respectively, the liquid crystal display panel had a wide viewing angle of 100:1 or more.

Evaluation Example 5

Evaluation of Viewing Angle

Figure 11:
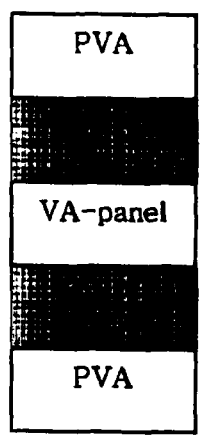
FIG. 11 is a schematic cross-sectional view of a symmetric liquid crystal display panel having a PNB compensation film on both surfaces of a liquid crystal cell according to another embodiment of the present invention.

A symmetric liquid crystal display panel having a polynorbornene (PNB) compensation film on both surfaces of a liquid crystal cell as illustrated in FIG. 11 was investigated for viewing angle characteristic via simulation.

Figure 12:
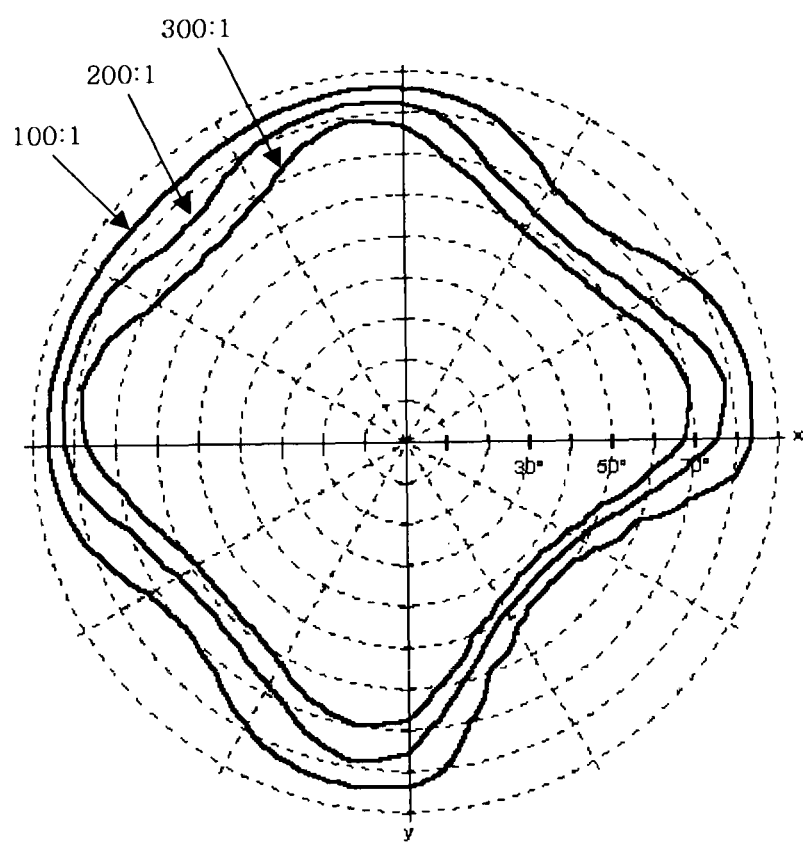
FIG. 12 illustrates a contrast ratio map simulated using the liquid crystal display panel of FIG. 11.

FIG. 12 illustrates a contrast ratio map simulated using the liquid crystal display panel of FIG. 11. When $R_{in}$ and $R_{th}$ of the PNB compensation film were adjusted to be 45 nm and −120 nm, respectively, the liquid crystal display panel had a wide viewing angle of 100:1 or more.

As described above, according to the method of manufacturing a biaxial-optical polynorbornene-based film of the present invention, a biaxial-optical film having both in-plane retardation and retardation in a thickness direction can be manufactured by uniaxially stretching a polynorbornene-based polymer having an inherent birefringence in a thickness direction. Thus, one polynorbornene-based film manufactured according to the present invention can replace two conventional uniaxial optical compensation films, i.e., an A-plate and a negative C-plate. When the polynorbornene-based film is used as a protective film for PVA polarizer, an A-plate, a negative C-plate, and a protective film for PVA polarizer can be replaced by one polynorbornene-based film.

Thus, the present invention can reduce the thickness of a liquid crystal display panel and simplify a production process. Furthermore, when the polynorbornene-based film is stretched in a width direction, it can be laminated on a PVA polarizer using a continuous roll-to-roll lamination process upon manufacturing an integrated optical compensation polarizer. In addition, since the film is stretched at a temperature much less than the glass transition temperature of an addition-type polynorbornene-based polymer, the film can be prevented from yellowing during the manufacture of a stretched polynorbornene-based film.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a biaxial-optical polynorbornene-based film, comprising:
preparing a polynorbornene-based polymer containing composition by dissolving a polynorbornene-based polymer in a mixed solvent containing a high-boiling solvent and a low-boiling solvent, with a difference in boiling points of the two solvents of 20° C. or greater and an amount of the high-boiling solvent being 0.1 to 15 wt % based on a weight of the polynorbornene-based polymer;
casting and partially drying the composition to obtain a polynorbornene-based film containing 1 to 6 wt % of the mixed solvent based on the total weight of the polynorbornene-based film; and
biaxially stretching the partially dried film in two directions parallel with the surface of the film at a stretching temperature less than or equal to the boiling point of the high-boiling solvent +20° C. and drying the stretched film at a temperature greater than or equal to the boiling point of the high-boiling solvent.

2. The method of claim 1, wherein the mixed solvent further comprises 0.1-200 wt % of at least one solvent having a boiling point between the boiling point of the high-boiling solvent and the boiling point of the low-boiling solvent based on the weight of the polynorbornene-based polymer.

3. The method of claim 1, wherein, when $n_x$ is a refractive index in a slow axis direction (x-direction) in-plane of film, $n_y$ is a refractive index in a y-direction which is perpendicular to the x-direction in-plane of film, and $N_z=(n_x-n_z)/(n_x-n_y)$, the polynorbornene-based film satisfies the two requirements of $n_x>n_y>n_z$ and $1 \leq N_z \leq 10$.

4. The method of claim 2, wherein, when $n_x$ is a refractive index in a slow axis direction (x-direction) in-plane of film, $n_y$ is a refractive index in a y-direction which is perpendicular to the x-direction in-plane of film, and $N_z=(n_x-n_z)/(n_x-n_y)$, the polynorbornene-based film satisfies the two requirements of $n_x>n_y>n_z$ and $1 \leq N_z \leq 10$.

* * * * *